United States Patent
Wang et al.

(10) Patent No.: US 11,236,184 B1
(45) Date of Patent: Feb. 1, 2022

(54) METHOD FOR PRODUCING POROUS MICROSTRUCTURE

(71) Applicant: Tantti Laboratory Inc., Taoyuan (TW)

(72) Inventors: Shih-Yu Wang, Taoyuan (TW); Hui Chen, Taoyuan (TW); Pang Lin, Taoyuan (TW); Min-Shyan Sheu, Taoyuan (TW)

(73) Assignee: Tantti Laboratory Inc., Taoyuan (TW)

( * ) Notice: Subject to any disclaimer, the term of this patent is extended or adjusted under 35 U.S.C. 154(b) by 0 days.

(21) Appl. No.: 17/184,276

(22) Filed: Feb. 24, 2021

(30) Foreign Application Priority Data

Jul. 17, 2020 (TW) .................................. 109124248
Jan. 6, 2021 (TW) .................................. 110100498

(51) Int. Cl.
*C08F 2/32* (2006.01)
*C08J 9/28* (2006.01)
*C08F 12/08* (2006.01)

(52) U.S. Cl.
CPC ............... *C08F 12/08* (2013.01); *C08J 9/286* (2013.01); *C08J 2205/044* (2013.01); *C08J 2325/06* (2013.01)

(58) Field of Classification Search
CPC ...... C08F 12/08; C08J 9/286; C08J 2205/044; C08J 2325/06
See application file for complete search history.

(56) References Cited

U.S. PATENT DOCUMENTS

| | | | | |
|---|---|---|---|---|
| 5,189,070 A | * | 2/1993 | Brownscombe | C08F 2/32 521/146 |
| 6,750,261 B1 | * | 6/2004 | Clear | C08J 7/056 521/50.5 |
| 2004/0097609 A1 | * | 5/2004 | Hahnle | A61L 15/26 521/187 |
| 2004/0204510 A1 | | 10/2004 | Clear et al. | |
| 2004/0214961 A1 | * | 10/2004 | Gartner | A61L 15/60 525/329.7 |
| 2005/0197414 A1 | * | 9/2005 | Granberg | C08J 9/28 521/50 |
| 2015/0353699 A1 | * | 12/2015 | Foudazi | B29C 67/202 521/120 |

FOREIGN PATENT DOCUMENTS

| | | |
|---|---|---|
| CN | 103037809 A | 4/2013 |
| CN | 107311185 A | 11/2017 |
| JP | 4766812 B2 | 9/2011 |
| WO | 2019087185 A1 | 9/2019 |

OTHER PUBLICATIONS

TW109124248 1stOA SR.
Patrick J. Colver et al. Cellular Polymer Monoliths Made via Pickering High Internal Phase Emulsions, Chem. Mater. 2007, 19, 1537-1539.
TW110100498 1stOA SR.

* cited by examiner

*Primary Examiner* — Irina S Zemel
(74) *Attorney, Agent, or Firm* — Demian K. Jackson; Jackson IPG PLLC

(57) ABSTRACT

The invention relates to production of a porous microstructure using the high internal phase emulsion (HIPE) templating technology. The invented method involves subjecting an emulsion prepared by emulsification of two immiscible phases to forced sedimentation, such as subjecting the emulsion to centrifugation, so as to increase the volume ratio of the dispersed phase to the continuous phase to obtain a high internal phase emulsion (HIPE), following by curing the continuous phase, whereby the porous microstructure thus produced has an increased porosity.

8 Claims, 4 Drawing Sheets

# METHOD FOR PRODUCING POROUS MICROSTRUCTURE

CROSS REFERENCE TO RELATED APPLICATION

This application claims priority to R.O.C. Patent Application No. 109124248 filed Jul. 17, 2020 and R.O.C. Patent Application No. 110100498 filed Jan. 6, 2021, both of which are hereby incorporated by reference in their entirety.

FIELD OF THE INVENTION

The invention relates to a method for producing a porous microstructure, and generally relates to use of the high internal phase emulsion (HIPE) templating technology to prepare a porous microstructure.

BACKGROUND OF THE INVENTION

High internal phase emulsion templating is an emerging technology for producing porous polymeric material. The so-called "high internal phase emulsion" refers to an emulsion where an internal phase (namely, a dispersed phase) of emulsified droplets with a volume fraction of over 74.05% are dispersed in an external phase. That is to say, the total volume fraction of the internal phase exceeds the maximum space that monodispersed microspheres can occupy in the emulsion. By virtue of polymerizing the external phase (namely, the continuous phase) of the high internal phase emulsion and then removing the internal phase, a polymerized high internal phase emulsion (polyHIPE) with high porosity and interconnected pores can be obtained. The porous material obtained by the high internal phase emulsion templating technology has an extremely large specific surface area and, therefore, is suitable for use as matrices for substance separation, cell culture scaffolds for tissue engineering, and support material for immobilizing enzymes. The high internal phase emulsion templating technology has the advantages of easy preparation, easy adjustment of the pore size, and easy introduction into mass production. In particular, when being used as a cell culture scaffold, the highly porous material allows cells to infiltrate into the pores, so that the cells, when cultured under agitation, can be well protected by the porous material from damage by the shearing force. In the case where the porous material serves as a substance separation matrix, its high porosity is also beneficial to overcome the problems of low mass transfer rate and excessive back pressure.

However, the high porosity of the porous microstructure may bring about the disadvantage of a decreased mechanical strength. Therefore, there is still a need in the art for a method that can produce a porous microstructure with increased porosity without substantially reducing its mechanical strength.

SUMMARY OF THE INVENTION

The invention involves emulsifying two immiscible phases to obtain an emulsion, and subjecting the emulsion to a forced sedimentation, such as subjecting the emulsion to centrifugation, to increase a volume fraction of the dispersed phase relative to the continuous phase in the emulsion to obtain a high internal phase emulsion (HIPE), and then curing the continuous phase in the high internal phase emulsion, thereby increasing the porosity of the porous microstructure produced.

In an aspect provided herein is a method for producing a porous microstructure comprising the steps of:

in the presence of a polymerization initiator and an emulsion stabilizer, emulsifying a continuous phase composition containing at least one monomer and a crosslinking agent with a dispersed phase composition containing a solvent and an electrolyte to obtain an emulsion containing a continuous phase and a dispersed phase dispersed in the continuous phase;

subjecting the emulsion to a forced sedimentation to increase a volume fraction of the dispersed phase relative to the continuous phase in the emulsion to obtain a high internal phase emulsion; and curing the continuous phase in the high internal phase emulsion to obtain the porous microstructure.

In one preferred embodiment, the dispersed phase has a volume fraction of at least 74.05% (v/v) in the high internal phase emulsion.

In one preferred embodiment, the step of subjecting the emulsion to a forced sedimentation comprises subjecting the emulsion to centrifugation and removing an excess part of the continuous phase separated from the dispersed phase. In a more preferred embodiment, the inventive method further comprises, prior to the step of forced sedimentation, a step of pre-polymerizing the at least one monomer and the crosslinking agent, so that the at least one monomer and the crosslinking agent are partially polymerized to an extent that the emulsion has an increased viscosity while still being flowable in the step of forced sedimentation.

In one preferred embodiment, the at least one monomer is selected from the group consisting of ethylenically unsaturated monomers and acetylenically unsaturated monomers. In a more preferred embodiment, the at least one monomer is selected from the group consisting of acrylic acids, acrylic acid esters, methacrylic acids, methacrylic acid esters, acrylamides, methacrylamides, styrene and its derivatives, silanes, pyrroles, divinylbenzene, 4-vinylbenzyl chloride, vinylpyridine, and combinations thereof.

In one preferred embodiment, the crosslinking agent is an oil-soluble crosslinking agent selected from the group consisting of ethylene glycol dimethacrylate (EGDMA), polyethylene glycol dimethacrylate (PEGDMA), ethylene glycol diacrylate (EGDA), triethylene glycol diacrylate (TriEGDA) and divinylbenzene (DVB). In another preferred embodiment, the crosslinking agent is a water-soluble crosslinking agent selected from the group consisting of N,N-diallylacrylamide and N,N'-methylenebisacrylamide (MBAA).

In preferred embodiments, the emulsion stabilizer is selected from nonionic surfactants. In more preferred embodiments, the emulsion stabilizer is selected from the group consisting of polyoxyethylated alkylphenols, polyoxyethylated alkanols, polyoxyethylated polypropylene glycols, polyoxyethylated mercaptans, long-chain carboxylic acid esters, alkanolamine condensates, quaternary acetylenic glycols, polyoxyethylene polysiloxanes, N-alkylpyrrolidones, fluorocarbon liquids and alkyl polyglycosides. In even more preferred embodiments, the emulsion stabilizer is selected from the group consisting of sorbitan monolaurate, sorbitan tristearate, sorbitan monooleate, glycerol monooleate, polyethylene glycol 200 dioleate, polyoxyethylene-polyoxypropylene block copolymers, castor oil, mono-ricinoleic acid glyceride, distearyl dimethyl ammonium chloride and dioleyl dimethyl ammonium chloride.

In preferred embodiments, the emulsion further comprises an promoter selected from the group consisting of N,N,N', N'-tetramethylethylenediamine (TEMED), N,N,N',N'',N''-pentamethyl diethylene triamine (PMDTA), tris(2-dimethylamino) ethylamine, 1,1,4,7,10,10-hexamethyltriethylenetetramine, and 1,4,8,11-tetramethyl-1,4,8,11-tetraazacyclotetradecane. In more preferred embodiments, the promoter is selected from N,N,N',N'-tetramethylethylenediamine (TEMED).

In one preferred embodiment, the dispersed phase composition further comprises an electrolyte.

BRIEF DESCRIPTION OF THE DRAWINGS

The above and other objects, features and effects of the invention will become apparent with reference to the following description of the preferred embodiments taken in conjunction with the accompanying drawings, in which.

DETAILED DESCRIPTION OF PREFERRED EMBODIMENTS

Unless specified otherwise, the following terms as used in the specification and appended claims are given the following definitions. It should be noted that the indefinite article "a" or "an" as used in the specification and claims is intended to mean one or more than one, such as "at least one," "at least two," or "at least three," and does not merely refer to a singular one. In addition, the terms "comprising/comprises," "including/includes" and "having/has" as used in the claims are open languages and do not exclude unrecited elements. The term "or" generally covers "and/or", unless otherwise specified. The terms "about" and "substantially" used throughout the specification and appended claims are used to describe and account for small fluctuations or slight changes that do not materially affect the nature of the invention.

Figure 1:
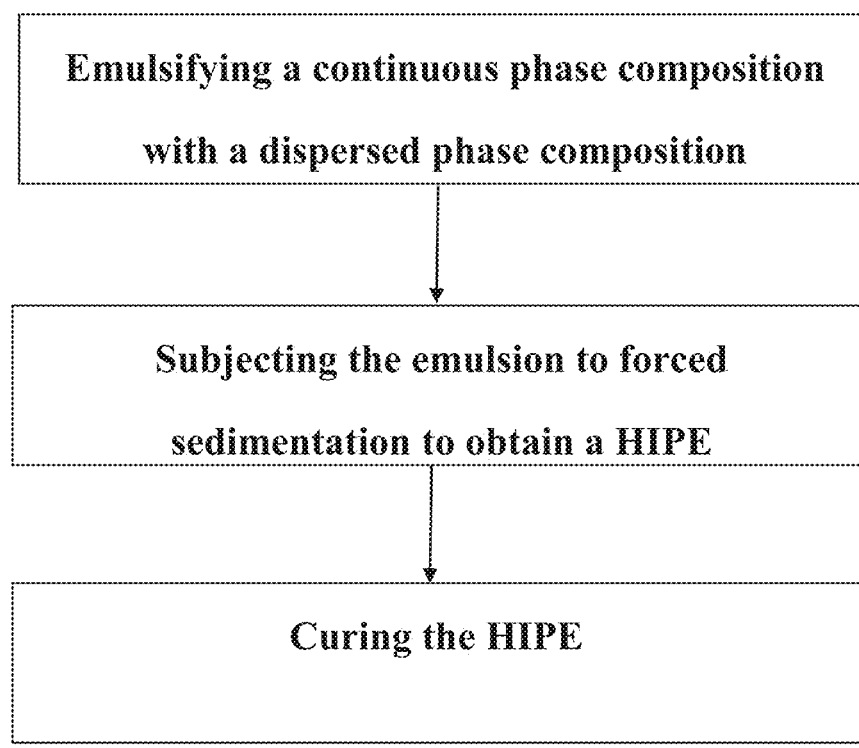
FIG. 1 is a flowchart of a method for producing a porous microstructure according to the invention.

The invention provides a method for producing a porous microstructure. According to the embodiment shown in FIG. 1, the invented method comprises the steps of: emulsifying a continuous phase composition with a dispersed phase composition to obtain an emulsion; subjecting the emulsion to a forced sedimentation to obtain a high internal phase emulsion; and curing the high internal phase emulsion to obtain the porous microstructure.

The term "high internal phase emulsion", or abbreviated as "HIPE", is used herein to refer to an emulsion of a continuous phase (i.e., external phase) and a dispersed phase (i.e., internal phase) immiscible with the continuous phase, preferably a water-in-oil emulsion or an oil-in-water emulsion, wherein the dispersed phase has a volume fraction of more than 74.05% (v/v) in the emulsion, i.e., the maximum space occupiable by uniform spheres in a closest packing arrangement, which can even be as high as 75-90% (v/v). As used herein, the term "continuous phase" may refer to a phase constituted by one material which is contiguous throughout the emulsion. The term "dispersed phase" may refer to a phase constituted by mutually separated units of a composition material dispersed in the continuous phase, while each and every unit in the dispersed phase is surrounded by the continuous phase. According to the invention, the continuous phase is usually the one in which polymerization occurs and may comprise at least one monomer, a crosslinking agent, and optionally an initiator and an emulsion stabilizer, whereas the dispersed phase may comprise a solvent and an electrolyte.

The at least one monomer is meant to encompass any monomers and oligomers that are capable of forming a polymer through polymerization. In one preferred embodiment, the at least one monomer comprises at least one ethylenically unsaturated monomer or acetylenically unsaturated monomer suitable for free radical polymerization, namely, organic monomers with carbon-to-carbon double bonds or triple bonds, which include but are not limited to acrylic acids and the esters thereof, such as hydroxyethyl acrylate; methacrylic acids and the esters thereof, such as glycerol methacrylate (GMA), hydroxyethyl methacrylate (HEMA), methyl methacrylate (MMA); acrylamides; methacrylamides; styrene and its derivatives, such as chloromethylstyrene, divinylbenzene (DVB), styrene sulfonate; silanes, such as dichlorodimethylsilane; pyrroles; vinylpyridine; and combinations thereof.

The term "crosslinking agent" as used therein may refer to a reagent that chemically bridges the polymer chains formed by polymerization of the at least one monomer. In one preferred embodiment, the "crosslinking agent" is a crosslinking monomer which can be dissolved along with the at least one monomer in the continuous phase and usually has multiple functional groups to enable the formation of covalent bonds between the polymer chains of the at least one monomer. Suitable crosslinking agents are well known in the art and can be selected depending upon the type of the at least one monomer, which include but are not limited to oil-soluble crosslinking agents, such as ethylene glycol dimethacrylate (EGDMA), polyethylene glycol dimethacrylate (PEGDMA), ethylene glycol diacrylate (EGDA), triethylene glycol diacrylate (TriEGDA), divinylbenzene (DVB); and water-soluble crosslinking agents, such as N,N-diallylacrylamide, N,N'-methylenebisacrylamide (MBAA). As known to those having ordinary skill in the art, the amount of the crosslinking agent used is positively correlated to the mechanical strength of the porous microstructure produced, that is, the higher the degree of crosslinking, the higher the mechanical strength of the porous microstructure. Preferably, the crosslinking agent is present in an amount about 5 to 50% by weight, such as in an amount about 5 to 25% by weight, of the continuous phase.

In addition to the monomer and the crosslinking agent, the continuous phase may optionally comprise other substances to modify the physical and/or chemical properties of the porous microstructure produced. Examples of these substances include, but are not limited to, magnetic metal particles, such as $Fe_3O_4$ particles; polysaccharides, such as cellulose, dextrans, agarose, agar, alginates; inorganic materials, such as silica; and graphene. For example, adding $Fe_3O_4$ particles may increase the mechanical strength of the porous microstructure and impart the porous microstructure with ferromagnetism.

The term "emulsion stabilizer" as used herein may refer to a surface-active agent suitable for stabilizing a high internal phase emulsion and preventing the droplet units of the dispersed phase from coalescence. The emulsion stabilizer can be added to the continuous phase composition or the dispersed phase composition prior to preparing the emulsion. The emulsion stabilizer suitable for use herein may be a nonionic surfactant, or an anionic or a cationic surfactant. In the embodiment where the high internal phase emulsion is a water-in-oil emulsion, the emulsion stabilizer preferably has a hydrophilic-lipophilic balance (HLB) of 3 to 14, and more preferably has a HLB of 4 to 6. In preferred embodiments, a non-ionic surfactant is used herein as the emulsion stabilizer, and the useful types thereof include, but are not limited to polyoxyethylated alkylphenols, polyoxyethylated alkanols, polyoxyethylated polypropylene glycols, polyoxyethylated mercaptans, long-chain carboxylic acid esters, alkanolamine condensates, quaternary acetylenic glycols, polyoxyethylene polysiloxanes, N-alkylpyrrolidones, fluorocarbon liquids and alkyl polyglycosides. Specific examples of the emulsion stabilizer include, but are not limited to sorbitan monolaurate (trade name Span®20), sorbitan tristearate (trade name Span®65), sorbitan monooleate (trade name Span®80), glycerol monooleate, polyethylene glycol 200 dioleate, polyoxyethylene-polyoxypropylene block copolymers (such as Pluronic® F-68, Pluronic® F-127, Pluronic® L-121, Pluronic® P-123), castor oil, mono-ricinoleic acid glyceride, distearyl dimethyl ammonium chloride, and dioleyl dimethyl ammonium chloride.

The term "initiator" may refer to a reagent capable of initiating polymerization and/or crosslinking reaction of the at least one monomer and/or the crosslinking agent. Preferably, the initiator used herein is a thermal initiator which is an initiator capable of initiating the polymerization and/or crosslinking reaction upon receiving heat. The initiator can be added to the continuous phase composition or the dispersed phase composition before preparing the high internal phase emulsion. According to the invention, the initiators which may be added to the continuous phase composition include, but are not limited to azobisisobutyronitrile (AIBN), azobisisoheptonitrile (ABVN), azobisisovaleronitrile, 2,2-Bis[4,4-bis(tert-butylperoxy)cyclohexyl]propane, and benzyl peroxide (BPO), whereas the initiators which may be added to the dispersed phase composition include, but are not limited to persulfates, such as ammonium persulfate and potassium persulfate. The high internal phase emulsion herein may further include a photoinitiator which can be activated by ultraviolet light or visible light to initiate the polymerization and/or crosslinking reaction and, alternatively, a suitable photoinitiator may be used to replace the thermal initiator.

The dispersed phase mainly includes a solvent. The solvent can be any liquid that is immiscible with the continuous phase. In the embodiment where the continuous phase is highly hydrophobic, the solvent may include, but be not limited to water, fluorocarbon liquids and other organic solvents that are immiscible with the continuous phase. Preferably, the solvent is water. In this embodiment, the dispersed phase may further include an electrolyte which can substantially dissociate free ions in the solvent and includes salts, acids, and bases that are soluble in the solvent. Preferably, the electrolyte may be an alkali metal sulfate, such as potassium sulfate, or an alkali metal or alkaline-earth metal chloride salt, such as sodium chloride, calcium chloride, and magnesium chloride. In the embodiment where the continuous phase is highly hydrophilic, the solvent may be selected from cyclohexane, hexane, heptane and octane. The dispersed phase may further contain one or more solutes, such as water-soluble non-ionic solutes, including carbohydrates, proteins, amino acids, alkanols and phenols.

The high internal phase emulsion may be added with a polymerization promoter. The term "promoter" may refer to a reagent capable of accelerating polymerization and/or crosslinking reaction of the at least one monomer and/or the crosslinking agent. Typical examples of the promoter include, but are not limited to, N,N,N',N'-tetramethylethylenediamine (TEMED), N,N,N',N'',N''-pentamethyl diethylene triamine (PMDTA), tris(2-dimethylamino) ethylamine, 1,1,4,7,10,10-hexamethyltriethylenetetramine, 1,4,8,11-tetramethyl-1,4,8,11-tetraazacyclotetradecane, which can promote the initiator, such as ammonium persulfate, to decompose into free radicals, thereby accelerating the polymerization and/or crosslinking reaction. Preferably, the promoter may be added in an amount of 10-100 mole % with respect to the added amount of the initiator.

The process of obtaining an emulsion through emulsification is known in the art, which generally involves uniformly mixing the at least one monomer with the crosslinking agent to form a continuous phase composition, and uniformly mixing the solvents with the electrolyte to form a dispersed phase composition. Subsequently, the continuous phase composition and the dispersed phase composition are mixed with agitation in a predetermined ratio, such as in a volume ratio of 5:95 to 40:60, so as to make the dispersed phase evenly dispersed in the continuous phase. In one preferred embodiment, the dispersed phase composition may be slowly added dropwise to the continuous phase composition, while being vigorously agitated to form an emulsion. In another preferred embodiment, an entire batch of the dispersed phase composition is directly added to the continuous phase composition at one time, while being vigorously agitated to form an emulsion. In the preferred embodiment where the dispersed phase composition is added in a single batch, a high-speed homogenizer may be used to vigorously stir and, therefore, apply a high shearing force to the emulsion, so that the separated units of the dispersed phase could have a uniform size. As well known in the art, the size and uniformity of the separated units of the dispersed phase may be adjusted by changing parameters such as the volume fraction of the dispersed phase relative to the continuous phase, the feeding rate of the dispersed phase composition, the type and concentration of the emulsion stabilizer, and the agitation rate and the temperature.

In the emulsion obtained by the emulsification step described above, the volume fraction occupied by the dispersed phase can be either higher than 74.05% (v/v) whereby the emulsion has a high internal phase, or lower than 74.05% (v/v) which will not result in a HIPE. According to the invention, no matter whether the emulsion prepared in the emulsification step has a high internal phase, the volume fraction of the dispersed phase relative to the continuous phase can be increased by subjecting the emulsion to a forced sedimentation to obtain a HIPE. The term "forced sedimentation" may refer to separation of a portion of the continuous phase composition from the dispersed phase composition based on a difference therebetween rather than gravity by applying an additional physical or chemical force to the emulsion, such as centrifugal force, pressure, electric power, magnetic force, ultrasonic vibration. Therefore, the technical means to achieve the forced sedimentation is intended to encompass centrifugation, pressurization, ultrasonic vibration and so on, and centrifugation is particularly preferred. Centrifugation enables a partial separation of the continuous phase composition from the dispersed phase composition in light of the density difference therebetween. This technical means allows the emulsion to have an expected two-phase volume ratio in a local region, while the rest is purely the continuous phase. After the latter is removed, a HIPE with an increased volume ratio of the dispersed phase to the continuous phase is obtained. For example, when the dispersed phase composition has a higher density than the continuous phase composition, the dispersed phase composition is forced to sediment towards a lower end of a centrifuge tube during centrifugation, while the continuous phase composition remains at an upper end of the centrifuge tube. Thus, a HIPE with an increased volume ratio of the dispersed phase to the continuous phase can be collected at the lower end of the centrifuge tube. Alternatively, if the dispersed phase composition has a lower density than the continuous phase composition, a HIPE can be collected at the upper end of the centrifuge tube. According to the invention, the intensity of the centrifugal force and the duration of centrifugation are determinant in the degree of the porosity of the porous microstructure produced. As shown in Examples 1-4 below, the stronger the centrifugal force exerted or the longer the centrifugal force applied, the higher the porosity of the porous microstructure produced. In the embodiment where styrene and divinylbenzene (DVB) are used as main components of the continuous phase composition and water is used as a main component of the dispersed phase composition, the centrifugal force applied to the emulsion is preferably within a range of 50 to 500×g. Without wishing to be bound by a particular theory, it is believed that centrifugation can increase the volume ratio of the dispersed phase relative to the continuous phase in the emulsion, resulting in an increase in contact areas of adjacent separated units of the dispersed phase. As these contact areas will be converted into interpores in the subsequent vacuum drying step, the increased contact areas will lead to an increase in the number and size of the interpores, thereby enhancing the porosity of the porous microstructure.

Prior to the forced sedimentation, the emulsified emulsion may be briefly subjected to heat and/or exposed to light with an appropriate wavelength and/or be added with a small amount of the promoter, thereby pre-polymerizing a portion of the continuous phase composition, i.e., allowing a portion of the at least one monomer and/or the crosslinking agent to be pre-polymerized. The degree of the pre-polymerization can be controlled either by allowing the continuous phase composition to receive a small portion of the total amount of heat or light needed to complete the polymerization and crosslinking reaction, preferably 5% to 50% of the total amount of heat or light, such as 10% to 20% of the total amount of heat or light, or by adding a small portion of the total amount of the promoter needed to complete the reaction of the continuous phase composition, preferably 5% to 50% of a total amount of the added promoter, such as 10% to 20% of the total amount of the added promoter, to enable 5% to 50% of the continuous phase composition, such as 10% to 20% of the continuous phase composition, to undergo polymerization and/or crosslinking reaction, so that the emulsion has an increased viscosity while still being flowable in the step of forced sedimentation. Suitable heating/irradiation duration and suitable amount of the promoter can be determined with reference to the prior art, and adjusted according to the molar ratio of the at least one monomer to the crosslinking agent in the continuous phase composition. During the pre-polymerization step, the promoter can be added all at once or added gradually. The term "added gradually" as used herein may mean that the promoter is divided into aliquots and added sequentially over a predetermined period of time. When adding the promoter, the emulsion may be stirred at a gentle rate to mix the promoter uniformly in the emulsion.

Application of the centrifugal force may cause coalescence of the dispersed phase, which may in turn cause adjacent units of the dispersed phase to merge and form new units with larger volumes, resulting in excessively large inner pores in the produced porous microstructure and a reduced mechanical strength of the porous microstructure. The inventors found that when the emulsion is pre-polymerized before undergoing the forced sedimentation, the coalescence of the dispersed phase can be suppressed. Without wishing to be bound by any particular theory, it is believed that the pre-polymerization step would help stabilize the emulsion against coalescence caused by the centrifugal force.

Figure 2:
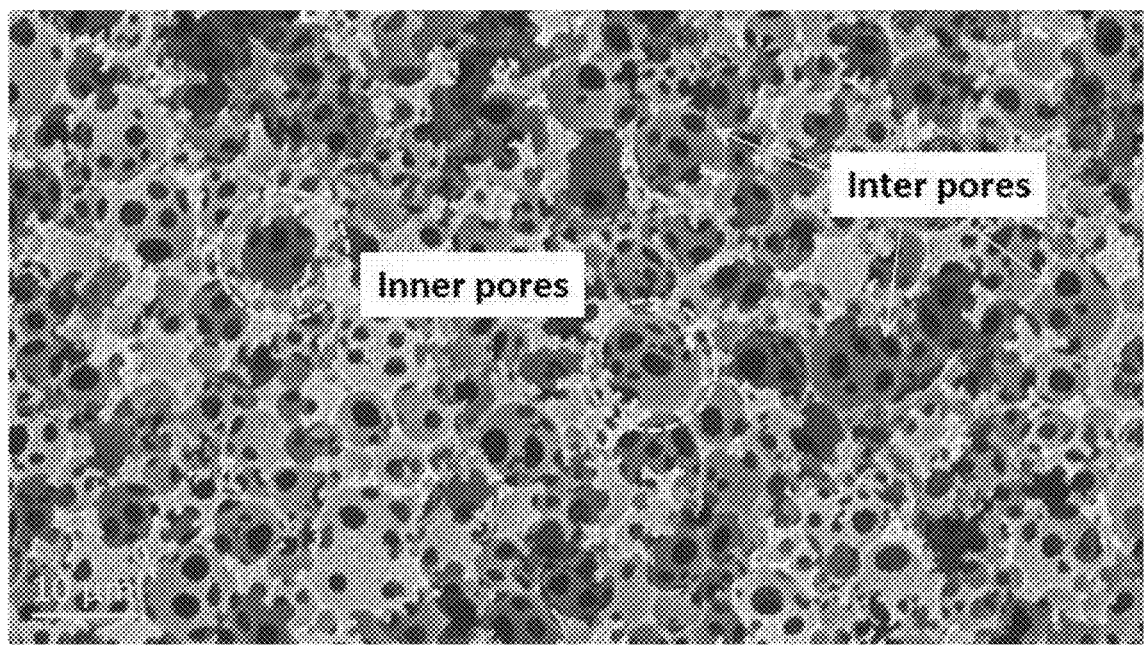
FIG. 2 is an electron microscopic image of a porous microstructure produced according to one embodiment of the invention.

In the HIPE produced according to the method stated above, the dispersed phase is spontaneously formed into droplets that are roughly spherical and uniformly dispersed in the continuous phase. The HIPE may be further subjected to heat, and/or exposed to light with an appropriate wavelength, or added with a promoter, so as to allow the at least one monomer and/or the crosslinking agent to complete polymerization and/or crosslinking reaction, whereby the HIPE is cured into a shaped mass. The term "cure" or "curing" as used herein may refer to a process of converting the HIPE into a structure with a stable free-standing configuration. The dispersed phase is removed afterwards from the cured HIPE. In the embodiment where the HIPE is a water-in-oil emulsion, the cured HIPE may be dried directly, preferably dried under vacuum, to thereby facilitate rupturing the droplets of the dispersed phase to generate the interpores. FIG. 2 shows the porous microstructure produced after drying, in which the voids left by removal of the dispersed phase become the inner pores of the porous microstructure, and the adjacent inner pores are communicated with one another by one or more interpores.

The porous microstructure produced according to the method disclosed herein has an extremely large specific surface area and possesses spherical inner pores with a diameter of about 1 micron to 150 microns, and multiple interpores with a diameter of about 500 nanometers to 25 microns communicating with the inner pores. The porous microstructure herein may be subjected to additional processing steps to manufacture various commercial products. In one preferred embodiment, the porous microstructure herein may undergo conventional processes such as cutting and packaging, followed by appropriate chemical modification and surface functionalization, to form a monolithic column for use as a stationary phase material for chromatographic separation. The term "monolithic column" as used herein may include a continuous medium composed of the porous microstructure. In another preferred embodiment, the porous microstructure herein may be used as a cell culture scaffold serving to imitate an extracellular matrix, on which cells may be inoculated and then attach and proliferate.

The following examples are given for the purpose of illustration only and are not intended to limit the scope of the invention.

Preparation of Porous Microstructures 0.4 grams of styrene (Acros Organics B.V.B.A.), 0.1 grams of divinylbenzene (DVB; Sigma-Aldrich Corporation, USA), 0.02 grams of azobisisobutyronitrile (AIBN; Uniregion Bio-Tech Inc.) and 0.12 grams of sorbitan monooleate (trade name Span®80; Emperor Chemical Co., Ltd.) were mixed with ultrasonic vibration to prepare a continuous phase composition. 1.0 grams of deionized water was then added to the continuous phase composition, and a water-in-oil emulsion was prepared by vigorous stirring using a high-speed homogenizer (model T25; IKA, Germany). Equal aliquots of the emulsion were placed in 15 mL cylindrical centrifuge tubes (Guangzhou Jet Bio-Filtration Co., Ltd.), and centrifuged in a centrifuge (Thermo Sorvall X4R Pro; Thermo Fisher Scientific Inc., USA) for the duration times and at the centrifugal rates listed in Table 1. After the centrifugation, the emulsions were placed in an oven (model DENG YNG DO60) and heated at 70° C. for 9 hours to complete polymerization. The polystyrene porous microstructures thus obtained were rinsed with ethanol, thereby removing unreacted styrene monomers, DVB monomers and sorbitan monooleate. The porous microstructures were then placed in an oven (model DENG YNG D060) and dried at 50° C. under vacuum for 12 hours to obtain dried porous microstructures.

TABLE 1

|  | Centrifugal rate (rpm) | Duration (min.) |
| --- | --- | --- |
| Comparative example 1 | 300 | 5 |
| Example 1 | 500 | 5 |
| Example 2 | 500 | 7 |
| Example 3 | 500 | 9 |
| Example 4 | 750 | 5 |
| Comparative example 2 | 1000 | 5 |
| Comparative example 3 | 3200 | 5 |

Characterization of Porous Microstructures

The porosity of a porous microstructure is defined herein as a percentage of the pore volume relative to the total volume of the microstructure. The porosity values of the porous microstructures produced in Examples 1-4 and Comparative Examples 1-3 were calculated with the following formula:

1−[(weight of the porous microstructure/density of the continuous phase)/apparent volume of the porous microstructure]

Alternatively, porosity may be determined by taking cross-sectional images of the porous microstructures using a scanning electron microscope (Thermo Fisher Scientific Inc., Phenom Pro), and then calculating the porosity using ImageJ software (National Institutes of Health, Bethesda, Md., USA). The compression ratio of a HIPE is defined as the percentage of the final height of the dispersed phase of the HIPE in the centrifuge tube after centrifugation relative to its initial height in the centrifuge tube before centrifugation. The minimum interpore diameter of a porous microstructure was measured by capillary flow porometry (PMI Porous Materials Inc., CFP-1100AE), and the mechanical strength was evaluated by pinching individual porous microstructures with bare hands to check whether they are easy to break. Measured results are shown in Table 2 below.

TABLE 2

|  | Compression ratio (%) | Porosity (%) | Mechanical Strength |
| --- | --- | --- | --- |
| Comparative example 1 | 4.5 | 71.01 | Sufficient |
| Example 1 | 13.4 | 81.33 | Sufficient |
| Example 2 | 15.8 | 81.80 | Sufficient |
| Example 3 | 17.0 | 83.75 | Sufficient |
| Example 4 | 20.0 | 84.04 | Sufficient |
| Comparative example 2 | 20.1 | 87.25 | Fragile |
| Comparative example 3 | 20.4 | 90.18 | Fragile |

Figure 3A:
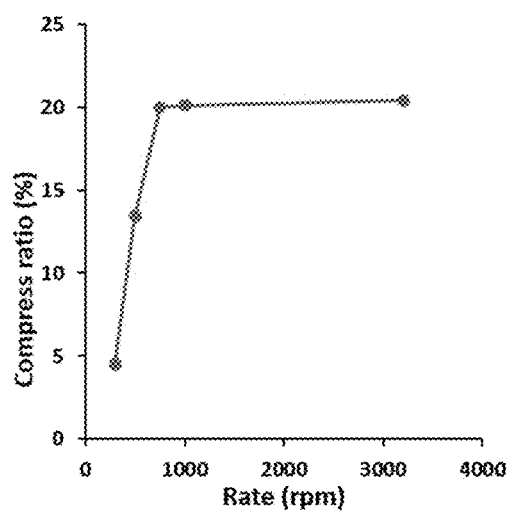
FIGS. 3(a) and 3(b) show the compression ratios of emulsions subjected to different intensities of centrifugal force for a fixed duration, and the porosity values of the porous microstructures produced therefrom.
Figure 3B:
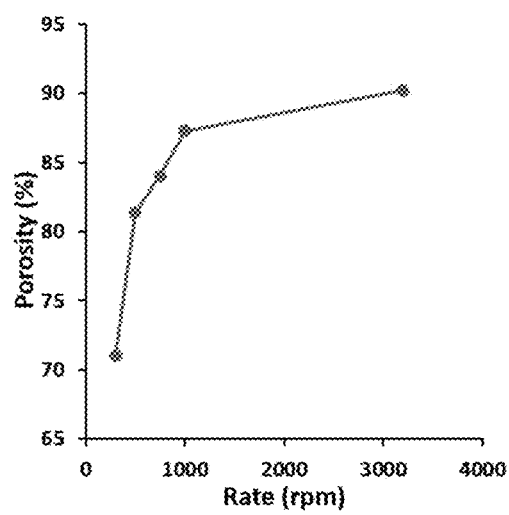

As shown in Table 1, Examples 1, 4 and Comparative Examples 1-3 involve subjecting the HIPE to different intensities of centrifugal force for a fixed duration (5 minutes). As shown in Table 2 and FIGS. 3(a), 3(b), the greater the centrifugal force applied for the fixed duration, the higher the compression ratio of the HIPE, and the higher the porosity of the porous microstructure produced. However, if the centrifugal force applied is too large, such as centrifuged at a rate of more than 1000 rpm, the porous microstructure produced would be easily broken by pinching with bare hands, indicating that its mechanical strength is considerably reduced.

Figure 4A:
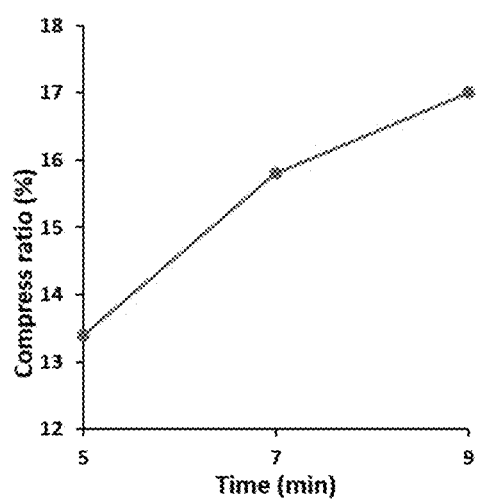
FIGS. 4(a) and 4(b) show the compression ratios of emulsions subjected to a fixed centrifugal force for different duration times, and the porosity values of the porous microstructures produced therefrom.
Figure 4B:
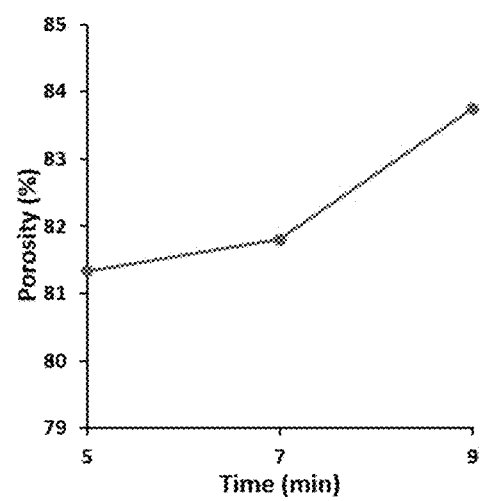

Furthermore, Examples 1-3 involve subjecting the HIPE to a fixed centrifugal force for different duration times. As shown in Table 2 and FIGS. 4(a), 4(b), the longer the time under the fixed centrifugal force, the higher the compression ratio of the HIPE, and the higher the porosity of the porous microstructure produced.

Figure 5A:
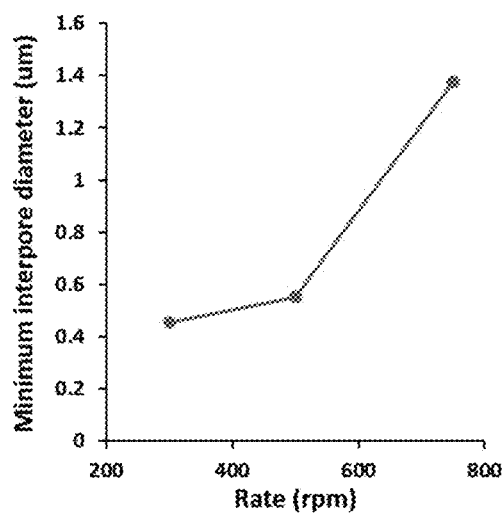
FIGS. 5(a) and 5(b) show the minimum interpore diameters of the porous microstructures produced from emulsions under different intensities of centrifugal force and/or for different centrifugal times.
Figure 5B:
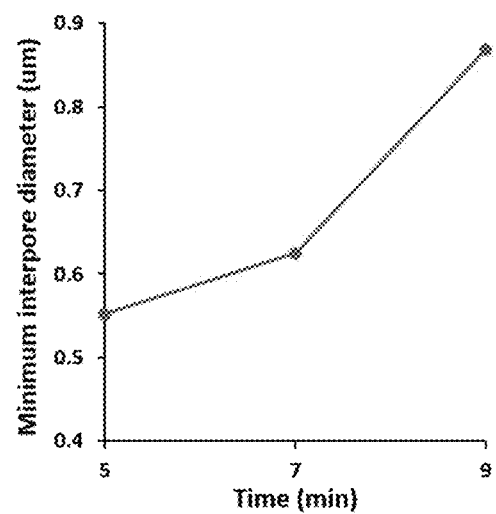

FIGS. 5(a) and 5(b) further show that the greater the centrifugal force applied to the HIPE or the longer the centrifugal duration the HIPE experiences, the bigger the diameter of the interpores in the porous microstructure produced.

While the invention has been described with reference to the preferred embodiments above, it should be recognized that the preferred embodiments are given for the purpose of illustration only and are not intended to limit the scope of the present invention and that various modifications and changes, which will be apparent to those skilled in the relevant art, may be made without departing from the spirit and scope of the invention.

What is claimed is:

1. A method for producing a porous microstructure comprising the steps of:
   in the presence of a polymerization initiator and an emulsion stabilizer, emulsifying a continuous phase composition containing at least one monomer and a crosslinking agent with a dispersed phase composition containing a solvent and an electrolyte to obtain an emulsion containing a continuous phase and a dispersed phase dispersed in the continuous phase;
   pre-polymerizing the at least one monomer and the crosslinking agent, so that the at least one monomer and the crosslinking agent are partially polymerized to an extent that the emulsion has an increased viscosity while still being flowable;
   subjecting the emulsion to a forced sedimentation to increase a volume fraction of the dispersed phase relative to the continuous phase in the emulsion to obtain a high internal phase emulsion, wherein the dispersed phase has a volume fraction of at least 74.05% (v/v) in the high internal phase emulsion, and wherein the subjecting the emulsion to a forced sedimentation comprises subjecting the emulsion to centrifugation and removing an excess part of the continuous phase separated from the dispersed phase; and
   curing the continuous phase in the high internal phase emulsion and removing the dispersed phase to obtain the porous microstructure.

2. The method as claimed in claim 1, wherein the at least one monomer is selected from the group consisting of ethylenically unsaturated monomers and acetylenically unsaturated monomers.

3. The method as claimed in claim 2, wherein the at least one monomer is selected from the group consisting of acrylic acids, acrylic acid esters, methacrylic acids, methacrylic acid esters, acrylamides, methacrylamides, styrene and its derivatives, silanes, pyrroles, divinylbenzene, 4-vinylbenzyl chloride, vinylpyridine, and combinations thereof.

4. The method as claimed in claim 1, wherein the crosslinking agent is an oil-soluble crosslinking agent selected from the group consisting of ethylene glycol dimethacrylate (EGDMA), polyethylene glycol dimethacrylate (PEGDMA), ethylene glycol diacrylate (EGDA), triethylene glycol diacrylate (TriEGDA) and divinylbenzene (DVB).

5. The method as claimed in claim 1, wherein the crosslinking agent is a water-soluble crosslinking agent selected from the group consisting of N,N-diallylacrylamide and N,N'-methylenebisacrylamide (MBAA).

6. The method as claimed in claim 1, wherein the emulsion stabilizer is selected from nonionic surfactants.

7. The method as claimed in claim 6, wherein the emulsion stabilizer is selected from the group consisting of sorbitan monolaurate, sorbitan tristearate, sorbitan monooleate, glycerol monooleate, polyethylene glycol 200 dioleate, polyoxyethylene-polyoxypropylene block copolymers, castor oil, mono-ricinoleic acid glyceride, distearyl dimethyl ammonium chloride and dioleyl dimethyl ammonium chloride.

8. The method as claimed in claim 1, wherein the emulsion further comprises a polymerization promoter selected from the group consisting of N,N,N',N'-tetramethylethylenediamine (TEMED), N,N,N',N'',N'''-pentamethyl diethylene triamine (PMDTA), tris(2-dimethylamino) ethylamine, 1,1,4,7,10,10-hexamethyltriethylenetetramine, and 1,4,8,11-tetramethyl-1,4,8,11-tetraazacyclotetradecane.

\* \* \* \* \*